United States Patent [19]

Barthel

[11] 4,055,268
[45] Oct. 25, 1977

[54] CRYOGENIC STORAGE CONTAINER
[75] Inventor: Alfred Barthel, Indianapolis, Ind.
[73] Assignee: Union Carbide Corporation, New York, N.Y.
[21] Appl. No.: 633,087
[22] Filed: Nov. 18, 1975
[51] Int. Cl.² .............................................. B65D 25/18
[52] U.S. Cl. .................... 220/9 C; 220/9 D; 220/9 LG; 428/285; 428/288; 428/296; 428/298; 428/461
[58] Field of Search ............... 220/9 C, 9 D, 9 LG, 220/14, 9 M; 428/285, 287, 296, 298, 302, 458, 461

[56] References Cited
U.S. PATENT DOCUMENTS 3,009,600 11/1961 Matsch .................................. 220/9 C
3,265,236 8/1966 Gibbon et al. ...................... 220/9 D

FOREIGN PATENT DOCUMENTS 235,188 6/1960 Australia ......................... 220/9 LG Primary Examiner—James J. Bell
Attorney, Agent, or Firm—John C. LeFever

[57] ABSTRACT

A double walled cryogenic storage container with a vacuum space containing multi-layer insulation comprising thin radiation layers separated by permanently precompressed sheets comprising fibers having 3–40 microns effective diameter in stacked crossing relationship and at least 1% of the fibers being heat softenable and heat bonded together at cross points without external binder.

9 Claims, 6 Drawing Figures

CRYOGENIC STORAGE CONTAINER

BACKGROUND OF THE INVENTION

This invention relates to a double-walled vacuum insulated container for product storage at cryogenic temperatures.

Double-walled vacuum insulated containers are widely used for the long-term preservation of living tissue, sperm and whole blood and for storage and tranportation of valuable cryogenic liquids. These containers usually employ in the vacuum insulation space, a composite multi-layered, external load-free insulation comprising low conductive fibrous sheet material layers composed of fibers for minimizing heat transfer by solid conduction, and thin flexible sheet radiation barrier layers. The radiation barrier layers are supportably carried in superimposed relation by the fibrous sheet layers to provide a large number of radiation barrier layers in a limited space for reducing the transmission of radiant heat across the vacuum space without perceptively increasing the heat transmission by solid conduction thereacross. Each radiation barrier layer is disposed in contiguous relation on opposite sides with a layer of the fibrous sheet material, the fibers being oriented substantially parallel to the radiation barrier layers and substanially perpendicular to the direction of heat inleak across the insulating space.

One such commonly used fibrous sheet material described in Matsch U.S. Pat. No. 3,009,600 is small diameter glass fibers (about 0.5 microns diameter) in permanently precompacted sheets of about 1.5 mils thick and weighing about 1.5 gms. per sq. ft. (hereinafter referred to as "glass microfiber"). The extreme finess of glass microfiber affords mechnical integrity of the separator in very thin sheet form without reliance on chemical binders to "glue" the fibers together. When an insulation comprising glass microfiber sheets alternating with thin aluminum foils is installed at near-optimum density of 70 layers/inch and in a vacuum of less than 0.1 micron Hg absolute, its thermal conductivity is about $2.5 \times 10^{-5}$ Btu/hr·ft° F. If a 29-liter liquid nitrogen container is provided with such an insulation, it is capable of obtaining a normal evaporation rate (NER) of about 0.33 lbs. of the liquid nitrogen per day.

The disadvantages of glass microfiber are its high cost and its extreme sensitivity to mechanical compression. The latter characteristic has been explained as the result of increasing the number of fiber-to-fiber contacts within the sheet which in effect shortens the path of heat flow between the reflective foils separated by the sheet. In practical usage of thin permanently precompacted-form spacers in multiple layer insulation, it is usually impossible to avoid high compression at least in localized areas of the insulation.

An alternative glass fiber material, described in Clapsadle U.S. Pat. No. 3,145,515, is large diameter (1.6–2.6 micron) fibers in fluffy uncompacted "web" sheets without significant binder. Lack of strength and poor handleability, characteristics of this separator, are accommodated by supporting the fiber sheet continuously on another, stronger sheet material such as the reflective foil used in the insulation. Thus, the supporting foil may be interleaved with the delicate fiber sheet at the time the latter is produced, and thereafter, the two components are handled and applied together during vessel manufacture as a single composite layer. The resultant multi-layer insulation is excellent for large vessels requiring moderately effective insulation, but its thermal conductivity (about $10 \times 10^{-5}$ Btu/hr·ft° F) does not meet the requirements for small cryogenic containers with long "holding" time.

An alternative to glass fiber sheets are the organic fiber separators described in Gibbon et al U.S. Pat. No. 3,265,236 having certain specifications including much lower intrinsic thermal conductivity than glass. By way of example, the patent states that with a rayon fiber, a minimum thermal conductivity for multi-layer insulation is obtained which is equal to glass fiber multi-layer insulation, but with fiber 16 to 24 times larger in diameter. In order to obtain strength and good handling characteristics with large fibers in thin sheets, the patent contemplates the use of binders such as polyvinylacetate in quantity such as 14 wt. % of the sheet. Sheet materials weighing 1.475 and 1.01 gms/ft.$^2$ are disclosed. In addition to rayon, other disclosed suitable organic fiber materials are cotton, Dacron, Dynel and nylon. Dacron is a polyester produced by condensation of dimethylterephthalate, nylon is a polyamide and Dynel is a copolymer of vinyl chloride-acrylonitrile.

According to the Gibbon et al patent, fiber sheets may be produced from these organic materials using either paper-making or textile machinery. Textile sheets have not been used in commercial installations, however, due to relatively high cost and poor thermal efficiency. In paper-making machinery, the fibers are laid down on a moving screen and are compressed while wet as between rolls, so that after drying, the paper retains a compressed condition. Sheet materials produced of large diameter rayon fibers (e.g. 12–18 microns), in low thicknesses (e.g. 1–2 mils) and in light weight (e.g. 0.8 to 1.5 gms/ft.$^2$) afford satisfactory separators for composite insulations. One such material applied at near-optimum layer density of about 70 layers per inch provides a thermal conductivity on the order of $2 \times 10^{-5}$ Btu/hr·ft° F. The fiber sheets are reasonable in cost, being readily produced on wet-process, paper-making machinery.

The NER value for the above-described rayon fiber-aluminum foil multi-layered container is about 0.272 lbs/day of nitrogen based on a minimum 40 hour pump down time and an average (cold) vacuum pressure of about 0.13 micron Hg. It would be desirable to provide a container having a multi-layered insulation with even better thermal performance, i.e., lower thermal conductivity which permits lower NER. By way of example, for a 29 liter capacity container, the "holding time" for storing products based on the aforementioned NER is about 190 days. If this NER could be reduced by 8% to about 0.251 lbs/day, the holding time may be increased to 206 days before the container needs to be refilled with liquid nitrogen.

One object of this invention is to provide an improved multi-layered thermal insulation system for the vacuum space of double-walled cryogenic storage containers, characterized by low heat conductance and low material costs.

Other objects will be apparent from the ensuing disclosure and appended claims.

SUMMARY

This invention relates to an improved thermal insulation system for the vacuum space of a double-walled container for storing materials at low temperature.

The container is of general type which comprises an inner vessel for holding material at low temperature, a larger outer gas-tight casing having rigid self-supporting walls around the inner vessel of such size to form an intervening evacuated load-free space at an absolute pressure less than about 0.5 micron mercury. This space contains multi-layered thermal insulation comprising thin flexible sheet radiation barriers supported by and in alternating relation with low conductive fibrous sheet layers in the permanently precompacted form. In this invention the fibrous sheet layers weigh less than 2 grams/ft.$^2$ and have thickness greater than 0.7 mil, being comprised of fibers having an intrinsic thermal conductivity of less than 0.2 Btu/hr.·ft·° F and an effective diameter of 3-40 microns. The fibers are arranged in random overlaying crossing relationship in planes parallel to the sheet surface with at least 1 % (by number) of the fibers being heat solftenable and heat bonded directly to each other at some of the cross-points without external binder.

DESCRIPTION OF PREFERRED EMBODIMENTS

As used herein, "effective diameter" is the diameter of a circular fiber having the same cross-sectional area of solid material as the fiber being measured. By way of example, if the fiber is solid and circular, effective diameter is the as-measured diameter. If the fiber is hollow, effective diameter is based on measurement of the actual fiber material ignoring the lumen. If the fiber has a non-circular cross section, effective diameter is determined by measuring the actual cross-sectional area and calculating the diameter of a circular cross-section having the same cross sectional area. If the fiber diameter varies from end-to-end, "effective diameter is an average value.

The effective diameter of the individual fibers comprising the fibrous sheet is between 3 and 40 microns, preferably less than 30 microns and most preferably 10 to 30 microns. Fibers less than 3 microns effective diameter cannot be heat bonded to each other and fibers larger than 40 microns effective diameter excessively increase heat transfer by solid conduction and also the fibrous sheet thickness. The latter characteristic (large diameter fibers) also reduces the number of radiation shields which can be installed per inch of multi-layer insulation thickness. However, larger diameter fibers tend to be less expensive. The range of 10 to 30 microns effective diameter is a balance of these characteristics.

The fiber sheets of this invention may be produced by a variety of methods well known in the papermaking and textile arts. They may be produced by wet processes from slurries of papermaking or staple fibers or deposited dry in continuous fiber form commonly referred to as spun bonding. Irrespective of the method for laying the individual fibers in stacked relationship, the as-used sheet is formed by heat bonding at least 1% (by number) of the fibers directly to each other at some of the cross points without external binder. The fibers may be homogeneous in chemical composition and physical properties, or blends of fibers differing in composition and properties may be employed as long as they are heat softenable. Binders are commonly used in papermaking but are not acceptable for purposes of this invention because of their characteristically higher water adsorptivity. The adverse effect of high water regain value will be discussed hereinafter, and demonstrated by comparison of curves A and B in FIG. 5.

In spun bonding the individual fibers are secured in the sheet by occasional heat fusion of fiber-to-fiber contact points. Such heat fusion between fibers accounts for the strength and compactness of the sheet and non-fiber binders are not employed. By way of illustration, one spun bonding method is described in Petersen U.S. Pat. No. 3,502,538 and Levy U.S. Pat. No. 3,296,944 whereby a blend of two fibers having different softening points is laid in web form and is subsequently heated in a current of hot gas such as steam to bond the fibers together. In another spun bonding technique, homogeneous or blended fibers are heat bonded by heated rolls under light compression. In another example Vosburgh U.S. Pat. No. 3,368,934 describes a pattern of spun bonding whereby the fibers are heat fused at numerous tiny localized spots by passage through hot embossed rolls.

Both inorganic fibers as for example glass, and organic fibers are suitable for practice of this invention. Suitable polyolefins include polyethylene, as for example sold by Thiokol Chemical Corp., Waynesboro, Ohio, under the designation "DPL", and polypropylene, as for example sold under the trademark "Herculon" by Hercules Inc., Wilmington, Dela. Suitable polyesters include certain of those sold under the trademarks Dacron (E. I. DuPont) and Kodel (Tennessee Eastman Co., Kingsport, Tennessee). A suitable poly (vinylidene chloride) fiber is sold by Amtech Inc., Odenton, Md., possibly manufactured for material obtained from Dow Chemical Co., Midland, Mich., under the trademark "Saran". One suitable copolymer for acrylonitrile and vinyl chloride is sold by Union Carbide Corporation under the trademark "Dynel"; another modacrylic is sold by Tennessee Eastman Co. under the trademark "Verel". A suitable poly(vinyl chloride) is sold under the name vinyon by FMC corp., Philadelphia, Pa.

Although not a part of this invention, adsorbent material as for example activated carbon or molecular sieve 5A is preferably used to remove air and moisture traces from the evacuated space containing the instant multi-layered insulation. The combination of certain hydrophobic organic fiber multi-layered insulations and activated carbon adsorbent is the claimed subject matter of a copending U.S. Pat. application "Cyrogenic Storage Container and Manufacture" filed contemporaneously in the name of Alfred Barthel.

Figure 1A:
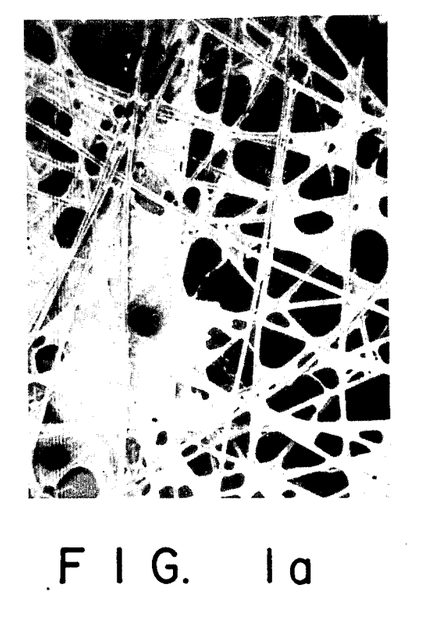
FIG. 1(a) is a photomicrograph (75 × magnification) of a polyester fibrous sheet in the permanently precompacted form, in which the fibers are bonded at some cross points by a chemical additive.
Figure 1B:
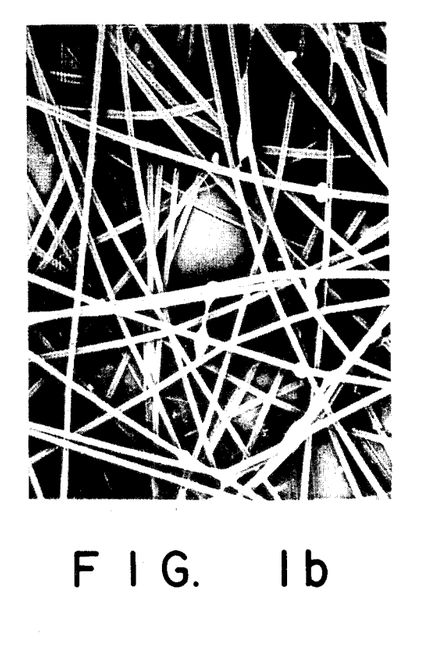
FIG. 1(b) is a photomicrograph (75 × magnification) of another polyester fibrous sheet in the permanently precompacted form, in which the fibers are heat bonded together at some cross points without an external binder.

The FIG. 1 photomicrographs illustrate the difference between polyester fiber sheets with a chemical binder (FIG. 1a) and with fibers heat bonded together at some cross points without an external binder (FIG. 1b). More particularly, the FIG. 1a sheet was formed from 90 weight % polyester fibers of 13 microns effective diameter having a water regain value of 0.4 weight % and 10% of weight manila fiber floc having a water regain value of 12 weight %, hence the fiber sheet water regain value is 1.6 weight %. It is estimated that the hydrophilic binder covers about 30% of the sheet surface area. The FIG. 1b sheet was formed from 100 weight % polyester fibers of 17 microns effective diameter having a water regain value of 0.4 weight % by spun bonding, with the fibers heat bonded together at cross points such that the bonding covers about 2% of the sheet surface.

Figure 3:
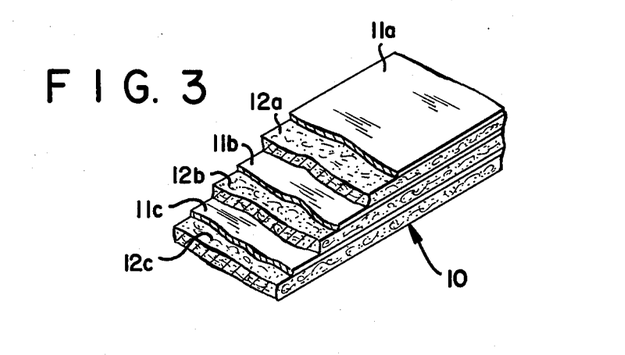
FIG. 3 is an isometric view of the composite multi-layer thermal insulation in a flattened position with parts broken away to expose underlying layers.

In the drawings, FIG. 3 shows multi-layer thermal insulation 10 comprising a plurality of thin flexible sheet radiation barriers 11 supported and in alternative relation with low conductive heat bonded fibrous sheet layers 12 in the permanently precompacted form. Radiation barriers 11 are preferably aluminum foils $\frac{1}{4}$ to $\frac{1}{2}$ mils thick having surface emissivity of about 0.035. However, metal plated plastics such as doubly aluminized polyethylene terephthalate may also be used as radiation barriers.

Multi-layer insulation 10 is applied to the inner vessel wall with low compression preferably so as to provide a balanced relationship between sufficient radiation barriers to greatly reduce heat transfer by radiation on one hand, but not with sufficient compression to greatly increase heat transfer by solid conduction. By way of example, each multi-layer insulation is characterized by a thermal performance curve which is a plot of thermal conductivity as a function of layer density, e.g., number of radiation shields per inch in the as-installed condition. The curve exhibits a minimum thermal conductivity at some value of layer density, and for this invention the multi-layer insulation 10 is preferably in the range of 40-80 radiation shields per inch installed thickness.

Figure 4:
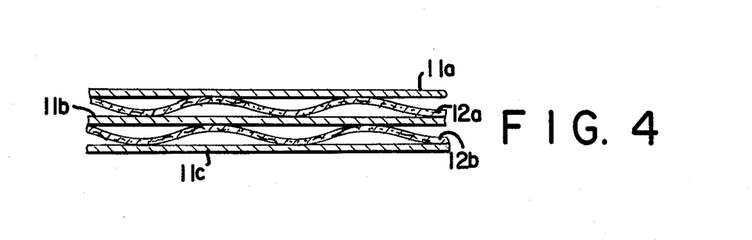
FIG. 4 is an elevated view taken in cross-section of a multi-layer insulation according to the present invention.

FIG. 4 is an enlarged view of the thermal insulation 10 which is believed to depict the heat transfer relationship between the individual layers. The thin permanently precompacted fibrous sheet layers 12 do not fill the space between the radiation shields 11 as does a fluffy web-form separator of the type described in Matsch U.S. Pat. No. 3,009,601, but instead it undulates within the spacing between adjacent radiation shields over a transverse distance substantially wider than its thickness, contacting first one shield 11a than the other facing shield 11b. For example, in a 70 radiation shield-/inch multi-layer insulation, the space occupied by $\frac{1}{4}$ mil thick aluminum foils is 70 × 0.00025 = 0.0175 inch. The uncompressed stack-height of 70 layers of thin heat bonded permanently precompacted fibrous sheets 12 will typically be about 0.5 inch. Thus, the combined thickness of the aluminum foils and fibrous sheets account for only 0.0175 + 0.5 = 0.52 inch of the full-inch dimension.

It appears from the foregoing that the mechanism of heat transport between adjacent radiation shields 11a and 11b involves another mode in addition to the well known heat flow from fiber-to-fiber at cross-contact points in order to traverse the thickness of fibrous sheets 12. The heat must additionally travel greatly extended distances along the length of the fibers in order to transverse laterally along the undulation from contact zones between the fibrous sheet and facing radiation shields 11a and 11b.

This altered mechanism is advantageous in that the heat transfer path from shield-to-shield is greatly extended which tends to reduce the heat transport by solid conduction through the multi-layer insulation. The tendency to reduce solid conduction is greater when fibers are composed of organic substances with low intrinsic conductivity of less than 0.2 Btu/hr·ft·° F. In the use of a relatively few, large diameter fibers (at least 3 microns) to compose the sheet 12, the altered heat transfer mechanism is particularly advantageous because it permits the use of heat bonding to obtain thinness and strength without incurring a large solid conductive penalty. In effect, the extension of the heat flow path along the fiber length tends to subordinate the importance of cross-contact resistances between the fibers. Thus, the overall effect is minimized of bonding some of the cross-contact points together.

It is preferred to employ lightweight fibrous sheets weighing less than 2 grams/ft.$^2$. For sheets weighing more than about 1.1 grams/ft.$^2$, the heat bonding preferably comprises less than 20% of the sheet surface. For sheets weighing less than 1.1 grams/ft.$^2$ the heat bonding may cover more of the surface area without excessively increasing heat transfer by solid conduction — perhaps up to 50% of the sheet surface.

Manufacture of the container of this invention will now be described in connection with FIG. 2, and using activated carbon adsorbent. This manufacturing method is claimed in the previously referenced copending U.S. patent application filed contemporaneously in the name of Alfred Barthel. Inner vessel 15 is provided with elongated neck tube section 16 for ingress and egress, and adsorbent retainer 17 may be placed on top of inner vessel 15 in concentric relation to the neck tube. A predetermined amount of activated carbon adsorbent material 18, preferably in granular form, is poured through the ring-shaped opening 19 between retainer 17 and the neck tube 16 outer wall. The adsorbent 18 is thus positioned in contiguous relationship with the outer wall of inner vessel 15, and with activated carbon this assembly step may be performed in an environment which is in gas equilibrium contact with atmospheric air.

Next the multi-layered insulation 10 is wrapped around (and over) the adsorbent retainer 17 and inner vessel 15 to the desired radiation shield density. To achieve the order-of-magnitude thermal insulating efficiency required for low temperature storage, at least 30 layers of radiation barriers are required per inch of installed layered insulation 10 (i.e., per inch of insulation thickness). With hydrophobic organic fibers such as polyester or polyolefins having a water regain value less than 1%, the insulation wrapping may also be performed in an environment which is in gas equilibrium contact with atmospheric air. Wrapping can be done in any convenient manner, for example by the orbital procedure alone, or by simultaneous orbital and spiral movement of separate insulation strips around the inner vessel, or by spiral wrap alone. If the latter is employed it will be necessary to cut a multiplicity of disc-shaped radiation barriers and fibrous sheets and position same beneath and above inner vessel 15. If desired, a multiplicity of thermally conductive shields 20 of the type described in Paivanas et al U.S. Pat. No. 3,133,422 and Barthel U.S. Pat. No. 3,341,052 may be positioned at selected locations or intervals during the multi-layer insulation wrapping.

Following the insulation wrapping, outer casing 21 is assembled around the insulation 10 outer surface to form an intervening evacuable load-free space 22. As used herein "load-free" means that the walls of inner vessel 15 and outer casing 21 are self-supporting and do not transmit pressure to the insulation 10. Space 22 is evacuated through connector 23 sufficient to reduce the pressure therein to below 70 microns mercury at ambient temperature, and preferably below 30 microns Hg. This level of evacuation is necessary to provide a double-walled container having sufficient heat insulating effectiveness for storage of material at low temperature. As previously discussed, with the hydrophobic organic fiber-type multi-layered thermal insulation and activated carbon adsorbent, such evacuation may be performed in less than 6 hours and preferably in less then 4 hours. With other systems such as rayon-type multi-layered thermal insulation and molecular sieve 5A adsorbent, evacuation time of at least 24 hours is needed.

Figure 2:
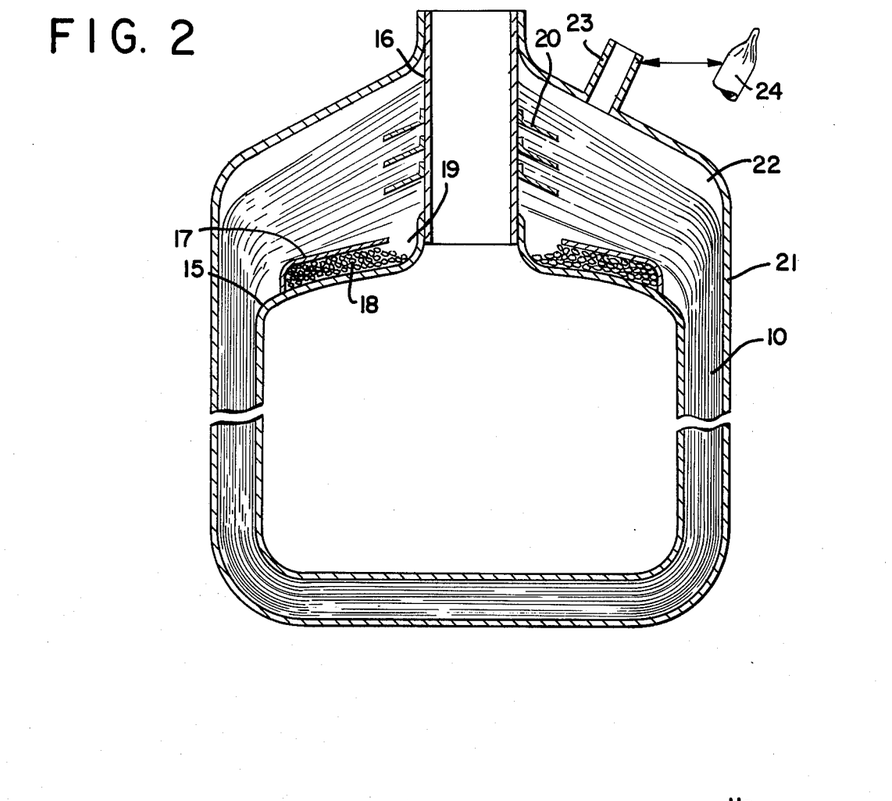
FIG. 2 is a front elevational view partly in section, of a double-walled liquefied gas container in which the invention may be practiced.

After evacuation space 22 is gas-tightly sealed as for example by pinching off the connector 23 at its outer end 24 as shown in FIG. 2a. Although not illustrated, getter material may also be provided in gas communication with the evacuated space 22, as for example described in the aforementioned Matsch et al U.S. Pat. No. 3,108,706. In contrast to the adsorbent, the getter material capsule should be joined to the warm outer casing 21 rather than cold inner vessel 15.

If molecular sieve 5A adsorbent is used, it must be pre-dried (typically between 600° and 800° F) and carefully protected from the atmosphere during handling, installation and assembly of the vessel. This is accomplished by pre-packaging the activated adsorbent in an impervious metal-plastic laminate, installing the package, and perforating the laminate immediately prior to the application of the insulation which must be done before the final closure of the container's outer casing. If hydrophilic fibers such as rayon are used to form the fibrous sheet layer 12, they cannot be employed as vacuum insulation without being pre-dried. This can be accomplished by baking in an oven, purged with dry nitrogen, then stored in an absolutely dry nitrogen atmosphere and wrapped around the inner vessel in a special "dry" room.

Figure 5:
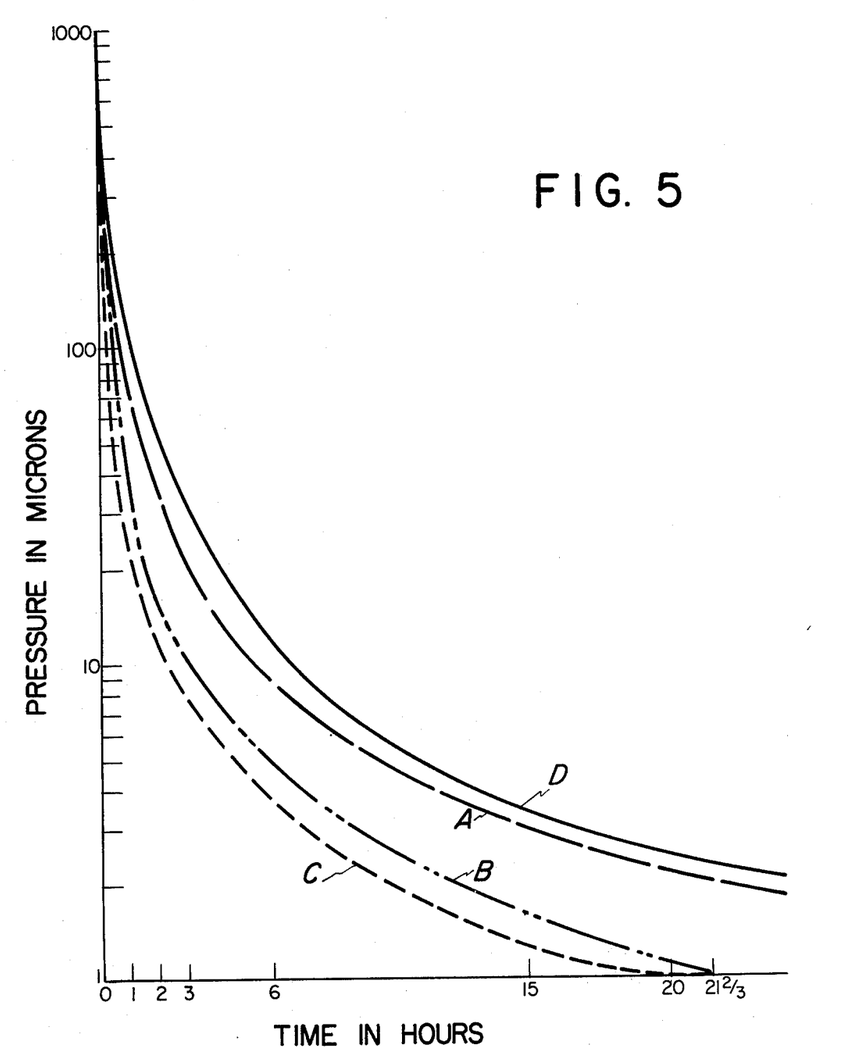
FIG. 5 is a graph showing the room temperature evacuation pressure for four multi-layered thermal insulation systems as a function of the evacuation time, wherein the fibrous sheets are formed of polyester and polyolefin.

In FIG. 5, curves A and B illustrate the evacuation pressure versus evacuation time relationship characteristics of composite multi-layer and adsorbent systems representing polyester fiber plus manila floc binder (curve A) and the present invention with polyester fiber heat bonded without external binder (curve B). The system of curve C was identical to that of curve B except that the fiber was polyolefin. The systems of curve D were based on the fiber sheets of curves B and C but the adsorbent was activated carbon. In each instance the multi-layered insulation was wrapped in the same orbital manner (and to the same density) described in Barthel U.S. Pat. No. 3,504,820 without simultaneous spiral wrapping, around an identical 29-liter vessel. The sheet radiation barrier was soft aluminum foil, 0.3 mil thick and 3 inches wide, and the permanently precompacted fibrous sheet was 3⅜ inch wide. Three frusto-conical sections formed from 1/32-inch thick aluminum sheeting as 6¼ inch diameter disks were used as heat conductive shields as described in Barthel U.S. Pat. No. 3,341,052. The wrapping procedure was to first apply 24-36 orbits of fiber sheet-foil insulation, then apply several single foil layers (without the fiber sheet) thermally joining them to the first heat shield, next apply 40-60 orbits of the fiber sheet-foil followed by further single aluminum foil layers thermally joined to the second shield, then 60-76 orbits of the fiber sheet foil followed by further single aluminum foil layers thermally joined to the third heat shield, and finally 72-90 orbits of fiber sheet-foil. This resulted in an average of 55 layers of the fiber sheet-aluminum foil multi-layered insulation. The four multi-layered fiber sheet-aluminum foil thermal insulation and adsorbent systems are as follows:

TABLE I

| Curve | Fiber Insulation | Adsorbent |
|---|---|---|
| A | polyester plus manila floc binder | molecular sieve 5A |
| B | polyester heat bonded without external binder | molecular sieve 5A |
| C | polyolefin heat bonded without external binder | molecular sieve 5A |
| D | polyolefin or polyester without external binder | activated carbon |

The polyester plus manila fiber sheet of curve A weighed about 0.86 grams/ft.$^2$, composed of fibers having an effective diameter of 13 microns and a water regain value of 1.6 weight %. This sheet was formed from 90 weight % polyester fibers having a water regain of 0.4 weight % and 10% by weight manila fiber floc having a water regain of 12 weight %, hence the fiber sheet water regain value of $0.4 + 0.1(12) = 1.6$ weight %. This fiber sheet was prepared by the "wet" method used in paper manufacturing, with the manila fiber floc as binder. It was purchased from James R. Crampton and Bros. Ltd., Elton Paper Mills, Bury, Lancashire, BL82AS, Great Britain. This is the fiber sheet of the FIG. 1(a) photomicrograph.

The polyester fiber sheet of curves B and D weighed about 1.26 grams/ft.$^2$, composed of fibers having an intrinsic thermal conductivity of 0.095 Btu/hr·ft·° F, effective diameter of 17 microns and a water regain value of 0.4 weight %. This polyester fiber sheet was the spun bonded type, purchased from E. I. DuPont de Nemours and Co., Wilmington, Delaware, under the trademark "Reemay". This is the fiber sheet of the FIG. 1(b) photomicrograph.

The polyolefin fiber sheet of curves C and D weighed about 1.35 grams/ft.$^2$, composed of fibers having an intrinsic thermal conductivity of 0.0725 Btu/hu·ft·° F, effective diameter of 7 microns and a water regain value of 0.01 weight %. This polyolefin sheet was polypropylene of the spun bonded type, purchased from Acme Mills Company, 5151 Loraine Avenue, Detroit Michigan, under the trademark "Fibertex", style 9. On inspection, the fiber sheet was heat fused in a square pattern of tiny localized areas each about 1/32-inch$^2$ and spaced about 12/inch so that about 16% of the fiber sheet surface area was fused.

As used herein, "water regain value" is an arbitrary figure formally adopted as the regain to be used with the oven-dry weight when calculating the commercial or legal weight of shipments on deliveries of any specific textile material, as defined in the ASTM standard D 1909-68 (Reapproved 1973). Representative values listed therein include the following:

| Fiber | water regain percent |
|---|---|
| Acrylic | 1.5 |
| Natural Cotton Yarn | 7.0 |
| Glass | 0.0 |
| Hemp | 12.0 |
| Modacrylic Class I | 0.4 |
| Nylon (polyamide) | 4.5 |
| Olefin | 0.0 |
| Polyester | 0.4 |
| Rayon | 11.0 |
| Saran | 0.0 |
| Spandex | 1.3 |
| Vinal | 4.5 |
| Vinyon | 0.0 |
| Wool | 13.6 |

The molecular sieve 5A adsorbent was calcium zeolite A in the form of 1/16-inch diameter × ⅛ inch clay-bonded pellets manufactured by Union Carbide Corporation, New York. The activated carbon was derived from petroleum base material with a surface area of 1250 meters$^2$/gm. and a water adsorptivity of 1 weight %. It was manufactured by Union Carbide Corporation and is sold under the trademark Columbia JXC carbon.

A comparison of the FIG. 5 curves reveals that for the polyester-manila floc binder and molecular sieve adsorbent system depicted by curve A, the pressure after 4 hours evacuation was about 15 microns Hg. For the heat bonded polyester-molecular sieve adsorbent system of curve B, the same pressure level was reached after only 2 hours — one half as long. Since the polyester fibers were substantially the same for the two fibrous sheets and the adsorbent was identical, the striking difference is attributable to the mode of fiber bonding and the resulting water regain values. Evacuation of the curve B and curve C fiber sheets produces lower pressures after shorter pumping periods than the curve A fiber sheet because the lower water content of the former results in a lower rate of water desorption. It is important to bear in mind that the evacuation step cannot be shortened significantly by increasing the size or capacity of the evacuation pumps. Except for an initial short period of evacuation, the rate of removal of gas is controlled by the slow rate of desorption of gas within the insulation space.

Curve C demonstrates that the same advantages of this invention are obtainable with polyolefin, i.e., polypropylene fiber sheets.

Curve D, depicting heat bonded polyester or polypropylene fibrous sheet-activated carbon adsorbent system, cannot be directly compared with the curves A, B and C systems because a different adsorbent material was involved.

In another series of tests, the aforedescribed fibrous sheet-adsorbent systems of curves A through D were sealed after 24 hours evacuation and the normal evaporation rate (NER) of each container was measured. This was done by placing the container of a beam balance and filling same with about 30 lbs. of liquid nitrogen. The container was then allowed to cool down for a least two days to reach steady state conditions in the rate of heat transfer. After the cooldown, the vacuum pressure was measured and two weight readings were taken separated by at least two days. The weight loss between the two readings served as a bias to calculate the NER per day with the following results:

TABLE II

| Curve | NER (liquid nitrogen lbs./day) | Vacuum Pressure (microns Hg) |
|---|---|---|
| A | 0.310 | 0.005 |
| B | 0.274 | 0.012 |
| C | 0.280 | 0.070 |
| D | 0.251 | 0.032 |

A comparison of the Table II NER values reveals that the curve B system (representing this invention) was about 11.6% lower than the curve A system even though polyester fibers of similar size were used.

The holding time for the 29 liter capacity container based on an NER of 0.310 is about 167 days. With this invention and based on the curve B NER of 0.0274, the holding time may be increased to 189 days before the container needs to be refilled with liquid nitrogen, which is more than three weeks improvement. It will be noted in Table II that the cold vacuum pressure for the curve A system is lower than the curve B system but this is of no consequence since both are so low that gas conduction is not a significant contributor to heat transfer.

The NER test for the curve C system demonstrates that with the same adsorbent (molecular sieve 5A), the evacuation and thermal insulating properties of spun-bonded polypropylene fibrous sheets are substantially the same as spun-bonded polyester fibrous sheets. The NER for heat bonded polyester or polypropylene fibrous heat-activated carbon adsorbent systems (curve D) was even lower than curves B and C. This demonstrates that the advantages of this invention can be obtained with different types of adsorbents.

In the preferred practice of this invention, the fibers are either polyester or polypropylene having effective diameter of 10 to 30 microns, and the fibrous sheet layers are spun bonded.

Although preferred embodiments of the invention have described in detail, it is contemplated that modifications may be made and that some features may be employed without others, all within the spirit and scope of the invention.

What is claimed is:

1. A container for storing materials at low temperatures comprising an inner vessel for holding such material; a larger outer gas-tight casing having rigid self-supporting walls around said inner vessel of such size to form an intervening evacuated load-free space at an absolute pressure less than about 0.5 micron mercury, said space containing multi-layered thermal insulation comprising thin flexible sheet radiation barriers being supported by and in alternating relation with low conductive fibrous sheet layers in the permanently pre-compacted form weighing less than 2 grams/ft$^2$ and being comprised of fibers having 3–40 microns effective diameter and an intrinsic thermal conductivity of less than 0.2 BTU/hr-ft$^2$-F/ft, said fibers being arranged in overlaying crossing relationship in planes parallel to the sheet surface with at least 1% (by number) of the fibers being heat softenable and heat self-bonded directly to each other at some of the cross-points without external binder, and said fibrous sheet layers undulating within the spacing between adjacent radiation shields over a transverse distance substantially wider than its thickness, contacting first one shield than the other facing shield.

2. A container according to claim 1 wherein the fibrous sheet layers are spun bonded.

3. A container according to claim 1 wherein the fibers are polypropylene.

4. A container according to claim 1 wherein the effective diameter of the fibers is less than 30 microns.

5. A container according to claim 1 wherein the effective diameter of the fibers is 10 to 30 microns.

6. A container according to claim 1 wherein the fibrous sheet layers weigh between 1.1 and 2 grams/ft.$^2$ and the area of fiber self-bonding comprises less than 20% of the sheet surface.

7. A container according to claim 1 wherein the fibers are polyester.

8. A container according to claim 1 wherein the fibers are polyester having effective diameter of 10 to 30 microns, and the fibrous sheet layers are spun bonded.

9. A container according to claim 1 wherein the fibers are polypropylene having effective diameter of 10 to 30 microns, and the fibrous sheet layers are spun bonded.

* * * * *

UNITED STATES PATENT OFFICE
CERTIFICATE OF CORRECTION

Patent No. 4,055,268　　　　　　　　　　Dated October 25, 1977

Inventor(s) Alfred Barthel

It is certified that error appears in the above-identified patent and that said Letters Patent are hereby corrected as shown below:

Column 10, line 65; "than" should read --then--.

Signed and Sealed this

Twenty-first Day of November 1978

[SEAL]

Attest:

RUTH C. MASON　　　　　　　　　　DONALD W. BANNER
Attesting Officer　　　　　　　　Commissioner of Patents and Trademarks